April 18, 1933.   M. C. TAYLOR ET AL   1,904,101
METHOD AND APPARATUS FOR CARRYING OUT CHEMICAL REACTIONS
Filed Sept. 19, 1930
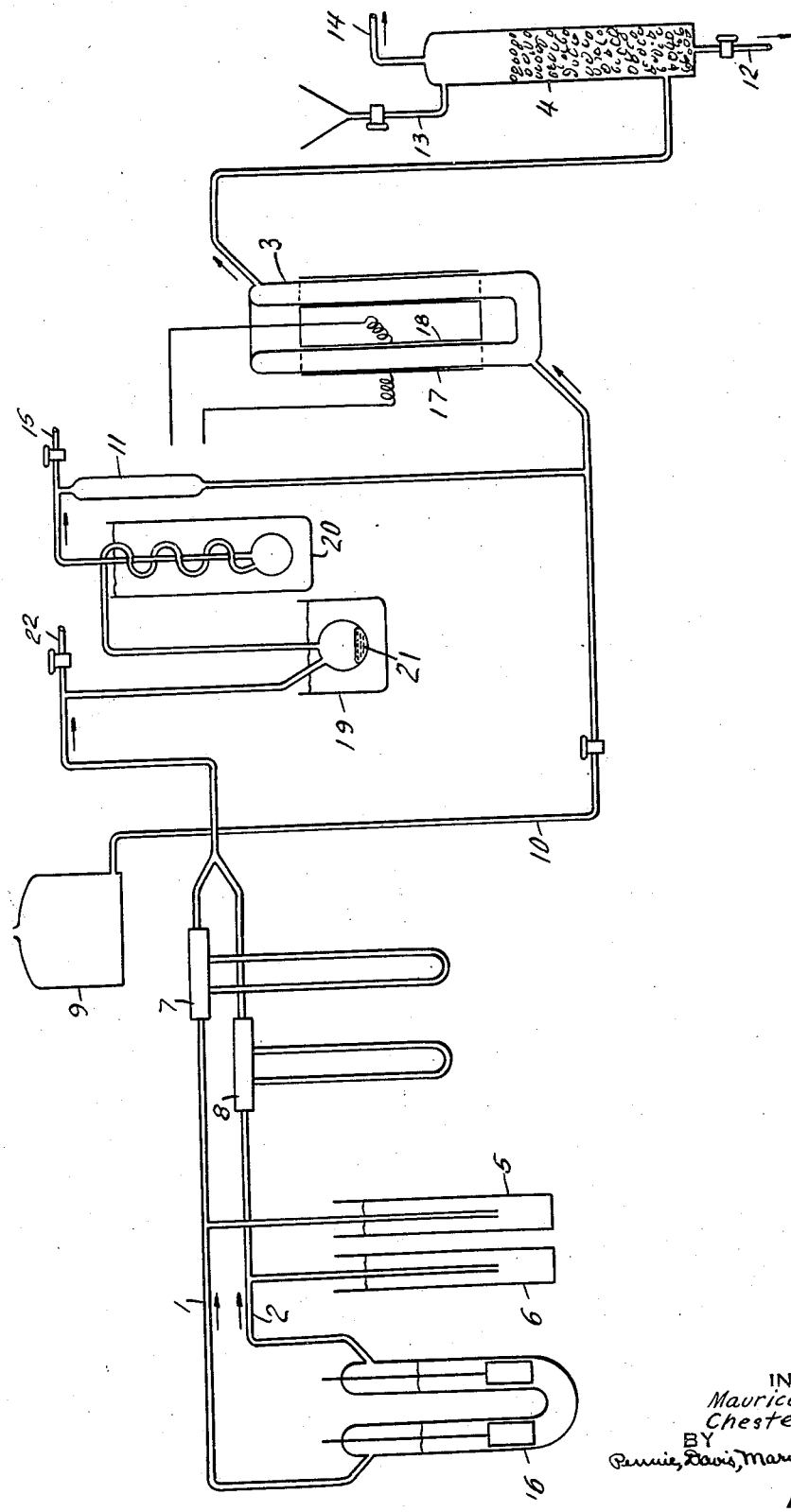
INVENTORS
Maurice C. Taylor
Chester N. Richardson
BY
Pennie, Davis, Marvin & Edmonds
ATTORNEYS Patented Apr. 18, 1933

1,904,101

UNITED STATES PATENT OFFICE

MAURICE C. TAYLOR AND CHESTER N. RICHARDSON, OF NIAGARA FALLS, NEW YORK, ASSIGNORS TO THE MATHIESON ALKALI WORKS, OF NEW YORK, N. Y., A CORPORATION OF VIRGINIA

METHOD AND APPARATUS FOR CARRYING OUT CHEMICAL REACTIONS

Application filed September 19, 1930. Serial No. 482,944.

This invention relates to improvements in the production, for example, of hydrogen peroxide, under the influence of the "corona" discharge.

By "corona" discharge, reference is intended to a non-arcing type of electrical breakdown of a gas. Mixtures of hydrogen and oxygen, for example, can be made to react to produce directly hydrogen peroxide by subjecting such gas mixtures to the influence of the corona discharge, for example, by passing the gas mixture through the "corona volume" under appropriate conditions. By "corona volume", reference is intended to the gas-filled space through which the corona discharge is taking place.

This invention relates to improvements, including improvements in method and in apparatus, in the application of the influence of the corona discharge to chemical reactions, such as that mentioned, effected in the gaseous phase.

According to the present invention, mercury vapor is passed through the corona volume together with the gaseous reactants. The gaseous reactants may, for example, be saturated with mercury vapor at the temperature at which they are supplied to the operation.

The invention will be further described in connection with the accompanying drawing which illustrates one form of apparatus embodying the invention and adapted for carrying out the invention. The particular apparatus illustrated is illustrated merely for the purpose of exemplification; the invention is not limited thereto.

The apparatus illustrated comprises an appropriate source of the gaseous reactants connected to the supply tubes 1 and 2, a saturator 19, a temperature-controlling bath 20, a reaction vessel 3 and a collection vessel 4. The supply tubes 1 and 2 include relief gauges 5 and 6 and flow meters 7 and 8 respectively. Receptacle 9 is provided for passing washing liquid, by means of valved connection 10, through the reaction vessel 3 at the end of an operation. Chamber 11 is provided to prevent passage of washing liquid through that part of the apparatus preceding the reaction vessel 3. Liquid product is discharged from the collection vessel 4 through tube 12. To assist in collection of the product, washing liquid may be supplied to the collection vessel 4 through connection 13. Either or both the reaction vessel 3 and the collection vessel 4 may be arranged in a bath, or baths, thermostatically controlled for example, to maintain an appropriate temperature, approximating the prevailing atmospheric temperature or higher or lower than this temperature; the temperature of the two vessels may be regulated independently. The saturator 19 consists of a chamber, adapted to maintain the surface of a supply of mercury 21 in contact with the stream of gases supplied through the tubes 1 and 2, arranged in a temperature-controlling bath. The bath 20 is provided to control the temperature of the gas mixture which has passed through the saturator 19. Effluent gases escape through tube 14. Such effluent gases may be recirculated through the reaction vessel 3 or a corresponding reaction vessel. The relief gauges 5 and 6 are regulated by adjusting the depth to which the discharge tubes connecting these gauges to the supply tubes are submerged in liquid therein. Valved connections 15 and 22 are provided for flushing that part of the apparatus preceding the reaction vessel 3.

The apparatus illustrated comprises an electrolytic cell 16, an appropriate source of hydrogen and oxygen for the production of hydrogen peroxide for example. It will be understood that hydrogen and oxygen, of appropriate purity for this reaction, may be supplied from such a source or from other sources, pressure cylinders for example, and that other gaseous reactants may be supplied from other sources, pressure cylinders for example.

The reaction vessel illustrated consists of a pair of tubes, of suitable glass for example, closed at the bottom and joined at the top forming a generally annular gas space and a pair of electrodes, an outer electrode 17 outside of the outer tube and an inner electrode 18 inside of the inner tube, the electrodes being connected across a high potential source of electrical energy. In operation, while the corona discharge is taking place therethrough, the annular gas space between the electrodes 17 and 18 constitutes, in the apparatus illustrated, the corona volume previously mentioned.

The invention will be further illustrated by an example of an operation embodying the invention as carried out in the apparatus illustrated.

A gas mixture consisting of oxygen about 3% and hydrogen about 97% saturated with mercury vapor at 20° C. under a pressure slightly exceeding one atmosphere is passed through the reaction vessel at a rate such that the average period of exposure within the corona volume approximates 53 seconds. The reaction vessel may be maintained at a temperature approximating 20° C. under a pressure slightly exceeding one atmosphere. A potential difference of 18.2 kilovolts at a frequency of 25 cycles per second, commercial, is maintained across the electrodes, the annular thickness of the corona volume being about 6.5 millimeters and the total thickness of the walls (Pyrex glass) of the reaction vessel between the electrodes being about 20 millimeters. About 5.9% of the oxygen is converted to hydrogen peroxide per pass through the reaction vessel with a consumption of about 130 kilowatt hours per kilogram of hydrogen peroxide (100% $H_2O_2$ by weight) produced, the production rate approximating 8.1 grams per liter of corona volume per day.

The reaction vessel may be operated at a temperature of from below $-75°$ C. to above 35° C. and under a pressure of from below 140 millimeters of mercury to above 1500 millimeters of mercury in the production of hydrogen peroxide by such operations, and the composition of the gas mixture supplied to the reaction vessel may be varied widely, due regard being had for the explosibility at the particular conditions maintained in the reaction vessel.

We claim:

1. In the production of hydrogen peroxide, the improvement which comprises subjecting a mixture of hydrogen, oxygen and mercury vapor to the corona discharge.

2. Apparatus for carrying out gaseous reactions comprising a reaction vessel adapted to subject gases passing therethrough to the corona discharge and means for saturating the gases supplied to the reaction vessel with mercury vapor.

In testimony whereof we affix our signatures.

MAURICE C. TAYLOR.
CHESTER N. RICHARDSON.